Sept. 23, 1952 W. KERBY 2,611,853

BATTERY HEATER

Filed Feb. 27, 1950

Inventor

WILMER KERBY by
Attorney

Patented Sept. 23, 1952

2,611,853

UNITED STATES PATENT OFFICE 2,611,853

BATTERY HEATER

Wilmer Kerby, Ottawa, Ontario, Canada

Application February 27, 1950, Serial No. 146,471

3 Claims. (Cl. 219—45)

This invention relates to improvements in a battery heater and appertains particularly to a warming hood for electric accumulators or storage batteries of the kind commonly used in automobiles and the like.

The principal object of the invention is to provide a battery heater energizable by the usual 110-volt line circuit and designed to superpose a battery and concentrate its heat on the top of the battery whence it is conducted into the battery by the metal elements thereof.

An object of the invention is to provide an electric heater to be energized by the usual 110-volt line service and removably mountable on an automobile battery on occasions when the vehicle is parked for any considerable period of time in cold weather.

Starting an automobile motor in winter is often diffcult, not alone because it requires more power to break the seal and turn over a cold engine, but chiefly because the battery's efficiency is so reduced in low temperatures. (The regular type battery used for this purpose has only 45% of the output at 0° F. that it has at 80° F.) Furthermore, a battery will not take a charge when the electrolyte is below 32° F. so a car, started in zero weather, must be run for approximately twenty to thirty minutes at a thirty ampere-hour charging rate before it begins to regain any of the potential used up in the starting.

It is a further object of the invention then to provide a battery heater for removable positioning on the top of a battery that will reflect heat onto the top of the battery, whence it is conducted to the interior thereof by the metal elements of the battery and retard radiation and convection of heat from the battery; whereby a battery may be economically kept warm in winter temperatures enabling it to deliver its maximum power for starting and, when the engine is running, able to begin immediately to take a charge to replenish the potential expended in the starting.

A further object of the invention is to provide a battery heater having a novel cable-straddling dielectric hood eliminating possibility of shorting the battery terminals and designed to rest in close-fitting engagement on the battery wall.

A still further object of the invention is the provision of a removable battery heater of the nature and for the purpose set forth that is characterized by structural simplicity, durability and efficiency, is easy to install, economical to use, and capable of manufacture, sale and maintenance at low cost: whereby the same is rendered commercially desirable.

To the accomplishment of these and related objects as shall become apparent as the description proceeds, the invention resides in the construction, combination and arrangement of parts as shall be hereinafter more fully described, illustrated in the accompanying drawings and pointed out in the claims hereunto appended.

The invention will be best understood and can be more clearly described when reference is had to the drawings forming a part of this disclosure wherein like characters indicate like parts throughout the several views.

Figure 1:
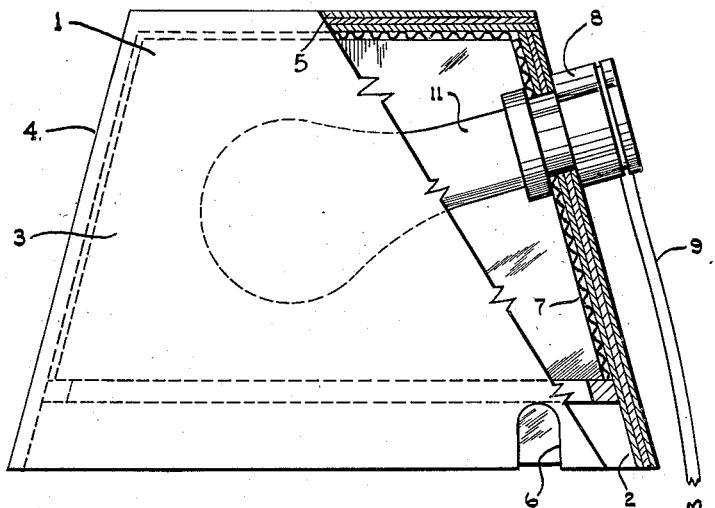
Figure 1 is a side elevation of the invention, with part of the hood broken away.
Figure 3:
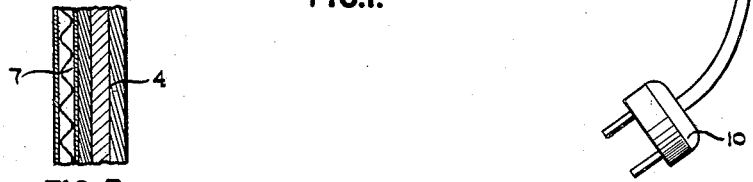
Figure 3 is an enlarged transverse section of the instant hood structure showing its di-electric heat-insulated and heat-radiating construction.
Figure 2:
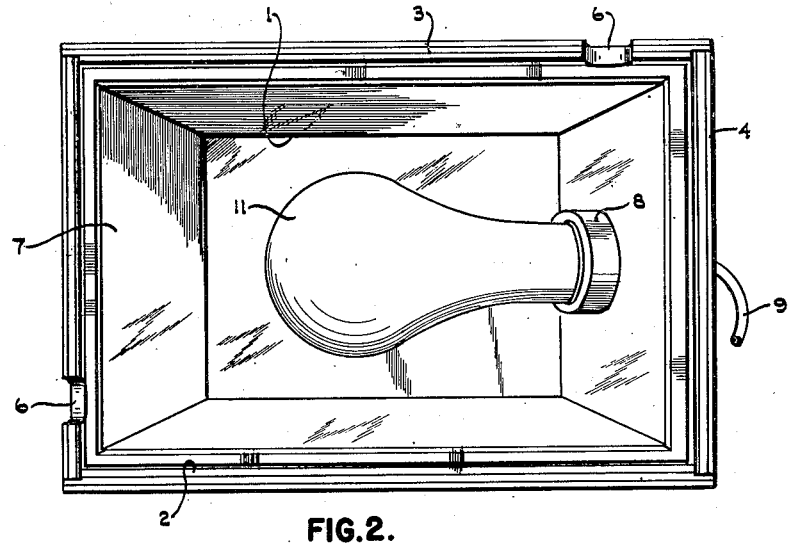
Figure 2 is a bottom plan view thereof.

Broadly, this invention contemplates the heating of an electric storage battery in cold weather by concentrating or focusing heat from an external source of the top of the battery whence it is conducted to the interior of the battery by the metal parts of the battery. A proven way of carrying out this operation in a successful and convenient manner is disclosed in the present application wherein a resistance element, energized by the usual 110-volt line circuit, is employed and provided with a suitable heat-insulating and heat-reflecting di-electric hood for mounting on a battery to concentrate the heat out put thereof on the battery top. The instant heater here shown and described is obviously but one possible embodiment of the invention that is susceptible of assuming many divers forms.

A rectangular box-like hood 1 of suitable dielectric material such as wood, plywood, Masonite, plastic (with high melting point), fiber glass or the like, has an open bottom 2 of a size and dimensions corresponding with the top of the battery with which it is to be used, and sides and ends 3 and 4 that taper slightly to a closed top or dome 5. To pass the usual battery cables, the lower edge of one side 3 and one end 4 are each provided at the appropriate places with an arched marginal notch 6, thus enabling the hood to rest in close-fitting engagement on the top of the battery wall.

The sides 3, ends 4 and top 5 of the hood are lined with a heat-insulating and heat-reflecting material 7, preferably comprising a corrugated asbestos central layer covered on each side with thin sheets of aluminum. This lining 7 does not reach to the open bottom 2 of the hood, beginning only about 1½ inches from the rim and above the notches 6; at least a sufficient distance above the lower rim of the hood to avoid any possibility of making contact with the battery posts, cell connectors or the cable terminals. A two-piece porcelain socket 8, having a lead wire 9 and connector plug 10, is mounted in an end of the hood and carries a conventional light bulb 11 that may be changed according to the outside temperature. For the hood on an ordinary size battery a 25 watt bulb gives off adequate heat in temperatures down to 15° F.; 40 watts to 0°; 50 watts to −20° F.; 60 watt to −30° F.; and 100 watts for lower temperatures.

Because the vibration incidental to motoring would likely shorten the life of the bulb, it is proposed that this plug-in type of heater be mounted on the battery only when the automobile in which the battery is located is being parked for any considerable length of time, as for instance during the night time or for all-day parking, where an electric service line outlet is available. In most modern cars where the battery is located under the hood this is easily done. If, however, it is desired to leave the heater in the car all the time and only connect and disconnect the line plug, the hood may be fastened down to the battery, or a solid type of resistance element may be used and permanently attached above the battery, encompassed by a suitable heat-insulating and heat-reflecting hood or blanket to direct the heat therefrom to the top of the battery as hereinbefore set forth.

In cold weather it has been found that the potential power of a fully charged battery drops with the temperature as follows:

| Battery temperature | Potential power |
|---|---|
| ° F. | Percent |
| 80 | 100 |
| 32 (freezing) | 65 (approx.) |
| (zero) | 45 (approx.) |
| 0-20 | 25 (approx.) |

Furthermore, when a car is used in cold weather only on short runs the battery does not warm up sufficiently to take a charge to replenish the power used up in starting so that it grows progressively weaker and the specific gravity of the solution drops with a corresponding rise in its freezing point as follows:

| Specific gravity | Freezing point |
|---|---|
|  | ° F. |
| 1,300 | −90 (approx.) |
| 1,250 | −65 (approx.) |
| 1,200 | −15 (approx.) |
| 1,150 | +5 (approx.) |
| 1,100 | +22 (approx.) |
| 1,050 | +25 (approx.) |

Thus, the keeping of the battery warm is very important if it is to render reliable and unfailing service in cold climates, firstly because it greatly increases the power potential, secondly because it enables it to take charge immediately the motor starts, and thirdly because it prevents or retards accumulating charge losses that cause a dangerously rising freezing point in the electrolyte.

Heats up to 175° may be applied to the top of an ordinary automobile battery without damaging the same and though not all such heat is conducted to the interior of the battery by the efficient distribution of its connectors and plates, tests in a cold room at −40° F. have shown heat reaching to the very bottom of the inside of the battery in sufficient quantity to give added battery potential. Additionally, it has been found that the ordinary battery box generally constructed of reclaimed rubber and paper serves as a very good insulator to retard the escape of heat from the battery.

From the foregoing description taken in connection with the accompanying drawings, it will be manifest that a battery heater is provided that will fulfill all the necessary requirements of such a device, but as many changes could be made in the above description and many apparently widely different embodiments of the invention may be constructed within the scope of the appended claims, without departing from the spirit or scope thereof, it is intended that all matters contained in the said accompanying specification and drawings shall be interpreted as illustrative and not in a limitative or restrictive sense.

Having thus described the invention, what is claimed as new is:

1. The combination with an electric storage battery connected in circuit of means for keeping the battery warm in cold weather comprising an electric heating element with a plug-in type connection for attachment to the usual 110 volt line service; a box-like hood in which said heating element is mounted having an open bottom removably restible on the top edge of the battery wall in close-fitting engagement, the rim of said open bottom having a spaced pair of battery cable-passing notches; and a heat-insulating and heat-reflecting lining in said hood, ending short of the open bottom of the hood by a distance greater than the distance the posts and cable terminals of the battery rise above the top edge of the wall thereof.

2. The combination with the structure set forth in claim 1, wherein said open-bottom hood is rectangular with the sides and ends tapering slightly to a closed top and wherein said notches occur in one end and one side wall in the form of marginal arches.

3. The combination with the structure set forth in claim 1, wherein the lining consists of a corrugated asbestos central layer covered on each side with a thin sheet of aluminum.

WILMER KERBY.

REFERENCES CITED

The following references are of record in the file of this patent:

UNITED STATES PATENTS

| Number | Name | Date |
|---|---|---|
| 881,017 | Morse | Mar. 3, 1908 |
| 906,556 | Perkins | Dec. 15, 1908 |
| 1,266,780 | Edison | May 21, 1918 |
| 1,436,060 | Strong | Nov. 21, 1922 |
| 1,444,561 | Schraeder | Feb. 6, 1923 |
| 1,687,196 | Daellenbach | Oct. 9, 1928 |
| 2,067,102 | Simon | Jan. 5, 1937 |